H. G. NELSON.
MILK CAN.
APPLICATION FILED SEPT. 27, 1917.
1,258,036.
Patented Mar. 5, 1918.
FIG. 1.
FIG. 3.
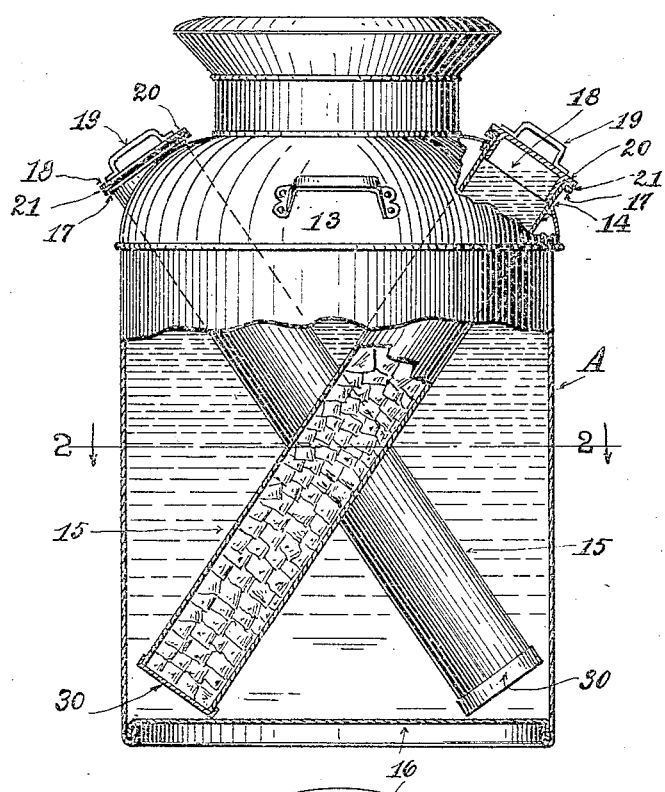
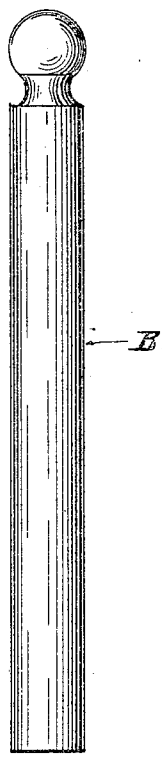
FIG. 2.
FIG. 4.
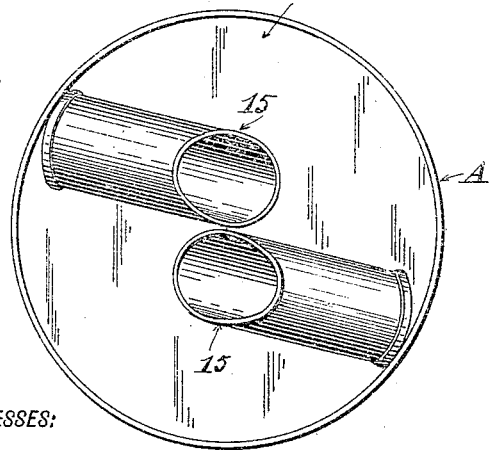
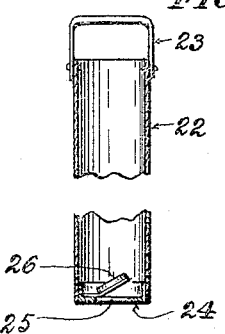
WITNESSES:
J. E. Stark.
J. Al. Stark.
INVENTOR:
HERBERT G. NELSON.
BY
Michael J. Stark
ATTORNEYS.

UNITED STATES PATENT OFFICE.

HERBERT GUSTAV NELSON, OF CHICAGO, ILLINOIS.

MILK-CAN.

1,258,036.  Specification of Letters Patent.  Patented Mar. 5, 1918.

Application filed September 27, 1917. Serial No. 193,561.

*To all whom it may concern:*

Be it known that I, HERBERT GUSTAV NELSON, a citizen of the United States, and a resident of the city of Chicago, in the county of Cook and State of Illinois, have invented a certain new and useful Improvement in Milk-Cans; and I do hereby declare that the following description of my said invention, taken in connection with the accompanying sheet of drawing, forms a full, clear, and exact specification, which will enable others skilled in the art to which it appertains to make and use the same.

My invention relates generally to improvements in milk cans; and it consists, essentially, in the novel and peculiar combination of parts and details of construction, as hereinafter first fully set forth and described and then pointed out in the claims.

The object of this invention is the production of a milk can which shall have efficient and serviceable means for keeping milk in cans at a suitable low temperature. Another object of this invention is the provision of suitable means for removing water of condensation from the can without necessitating the tilting of the can. Other objects of this invention will be apparent from the following description.

In the drawings forming a part of this specification, Figure 1 is an elevation, partly in section, of my improved milk can. Fig. 2 is a sectional plan of the same on line 2—2 of Fig. 1. Fig. 3 is an elevation of means employed for removing water from the can without tilting the same. Fig. 4 is a sectional elevation of a modified form of construction of this emptying means.

A, in the drawings designates a milk can of usual and standard construction, comprising a shell, a bottom in said shell, and a breast thereon. In the breast 13, of this can there are formed two openings 14, at diametrically opposite places; and into these openings, and securely soldered therein, there are placed tubes 15, of cylindrical form, which tubes extend downwardly in the can to the bottom 16, thereof, where the lower ends of the tubes are closed with caps 30, preferably soldered to the bottom 16, to prevent shaking and dislocation of the tubes. The upper ends of these tubes project above the breast and they are outwardly flanged, as at 17. Into the upper ends of these tubes are placed stoppers 18, wherewith the same are closed, convenient handles 19, on said stoppers facilitating their insertion and removal. These stoppers have, preferably outwardly extending flanges 20, and between these flanges and the flanges 17 on the tubes, there are placed packing washers 21.

Into these tubes is placed crushed ice, or artificially or naturally cooled water, which will keep the contents of the can at a suitably low temperature. After this ice has melted, or the water becomes warm, and it is desired to renew the same without turning the can over, or tilting the same, I provide means for removing the water, which may be a cylinder or rod B, (wood being suitable for the object in view) as illustrated in Fig. 3, the external diameter of which is approximately the same as the internal diameter of the tubes. Pushing this rod B into a tube will expel the water therefrom past the rod B, to escape at the upper end of the tube.

A modified construction of this water-ejector is shown in Fig. 4, which comprises a cylinder 22, of approximately the same diameter as the tube, said cylinder having a handle 23, by which it may be handled. This cylinder has a bottom 24, in which there is an opening 25, normally closed by a valve 26. Pushing this cylinder into one of the tubes 15 will cause the valve 26 to open and the water to enter the cylinder, the capacity of which is preferably that of a tube, so that one insertion of this cylinder will be sufficient to remove the water from the tube, or at least as much as is necessary to refill the tube.

It will now be noted that by inclining the tubes 15, to extend from one side of the breast to the bottom of the can at the opposite side thereof, I attain a greater cooling area than is possible with vertically located tubes, and by virtue of their crossing each other in the can, I secure a better distribution of the cooling-action of the refrigerant, than is otherwise obtainable.

The caps or stoppers on the tubes close the tubes practically tight so that no water will be spilled while the can is in transit, which is a desirable feature of my device and contributes to the effectiveness thereof. I make the tubes generally from tin plate, which is the material employed in milk cans; but where the expense or first cost is not an objection, I shall make them of brass or copper coated with pure tin, which metals, being better heat conductors than the steel plate that forms the basis of tin plate, will be the cheaper in the end owing to the saving of ice resulting from their use.

While I have hereinbefore described the preferred embodiment of my invention, I desire it to be understood that minor details of construction may be changed, and parts omitted without departing from the scope of my invention as defined in the subjoined claims.

Having thus fully described this invention, I claim as new, and desire to secure to myself by Letters Patent of the United States—

1. A milk can comprising a shell, a bottom on said shell, and a breast thereon, there being in said can a multiplicity of inclined tubes, said tubes projecting from above said breast into the can to the bottom thereof and passing each other approximately medially of their length, there being on the outer ends of said tubes stoppers for closing said tubes.

2. A milk can, comprising a shell, a bottom on said shell, and a breast thereon, a pair of tubes in said can, said tubes projecting above said breast at diametrically opposite points, and extending in said can diagonally to the bottom thereof, at the opposite side from which they enter the can and passing each other approximately medially of their length, the lower ends of said tubes being permanently closed, there being at the outer ends of said tubes stoppers, said tubes being provided with laterally extending flanges, said stoppers having similar flanges, and packing rings interposed between said flanges.

In testimony that I claim the foregoing as my invention, I have hereunto set my hand.

HERBERT GUSTAV NELSON.

Copies of this patent may be obtained for five cents each, by addressing the "Commissioner of Patents, Washington, D. C."